(12) United States Patent
Chen et al.

(10) Patent No.: US 9,989,973 B2
(45) Date of Patent: Jun. 5, 2018

(54) MEASUREMENT CONTROL SYSTEM FOR MULTI-SHAFT SUPPORTED AIR FLOATATION PLATFORM

(71) Applicant: Harbin Institute of Technology, Harbin, Heilongjiang Province (CN)

(72) Inventors: Xinglin Chen, Harbin (CN); Yang Liu, Harbin (CN); Cong Li, Harbin (CN); Weifeng Wang, Harbin (CN); Chuan Liu, Harbin (CN)

(*) Notice: Subject to any disclaimer, the term of this patent is extended or adjusted under 35 U.S.C. 154(b) by 389 days.

(21) Appl. No.: 14/892,778

(22) PCT Filed: May 6, 2014

(86) PCT No.: PCT/CN2014/076911
§ 371 (c)(1),
(2) Date: Nov. 20, 2015

(87) PCT Pub. No.: WO2014/187237
PCT Pub. Date: Nov. 27, 2014

(65) Prior Publication Data
US 2016/0124437 A1    May 5, 2016

(30) Foreign Application Priority Data
May 20, 2013    (CN) .......................... 2013 1 0187886

(51) Int. Cl.
*G05D 3/12*        (2006.01)
*G05B 19/27*       (2006.01)
(Continued)

(52) U.S. Cl.
CPC .............. *G05D 3/12* (2013.01); *F16F 15/00* (2013.01); *F16M 11/121* (2013.01);
(Continued)

(58) Field of Classification Search
CPC ..................... F16F 15/00; G05B 19/27; G05B 2219/49276; G05D 3/12; F16M 11/121; F16M 11/26; F16M 11/32; F16M 11/18
See application file for complete search history.

(56) References Cited

U.S. PATENT DOCUMENTS

| 7,003,399 B1 * | 2/2006 | Chappell ................ G01C 21/16 701/500 |
| 2009/0321631 A1 * | 12/2009 | Smick .................. F16M 11/123 250/282 |

(Continued)

*Primary Examiner* — Caridad Everhart
(74) *Attorney, Agent, or Firm* — Novoclaims Patent Services LLC; Mei Lin Wong

(57) ABSTRACT

A measurement control system for a multi-shaft supported air floatation platform, the system comprising a load feedback unit (5), an execution unit (6), a position measurement unit (7), a safety protection unit (8), a controller (9), a rotating motor (10), and a linear light source 11; the load feedback unit comprises M pressure sensors (5-1) and four differential sensors (5-2); the execution unit comprises M servo voice coil motors (6-1) and M servo voice coil motor drivers (6-2); the position measurement unit comprises a plane grating (7-1), M linear gratings (7-2) a linear array CCD (7-3), a tilt sensor (7-4), M electronic levels (7-5), and an indoor GPS (7-6); the safety protection unit comprises 2M proximity sensors (8-1) and M temperature sensors (8-2); and the linear array CCD consists of no few then six CCDs. The system solves the problems of leveling limitations and narrow application range of existing supporting platforms.

3 Claims, 6 Drawing Sheets

(51) Int. Cl.

| | |
|---|---|
| *F16M 11/26* | (2006.01) |
| *F16F 15/00* | (2006.01) |
| *F16M 11/12* | (2006.01) |
| *F16M 11/18* | (2006.01) |
| *F16M 11/32* | (2006.01) |
| *G05B 15/02* | (2006.01) |

(52) U.S. Cl.
CPC ............. *F16M 11/18* (2013.01); *F16M 11/26* (2013.01); *F16M 11/32* (2013.01); *G05B 15/02* (2013.01); *G05B 19/27* (2013.01); *G05B 2219/49276* (2013.01)

(56) References Cited

U.S. PATENT DOCUMENTS

2012/0007982 A1\* 1/2012 Giuffrida ............... G01C 11/02
  348/144
2014/0302462 A1\* 10/2014 Vatcher ................... G09B 9/12
  434/55

\* cited by examiner

MEASUREMENT CONTROL SYSTEM FOR MULTI-SHAFT SUPPORTED AIR FLOATATION PLATFORM

CROSS REFERENCE OF RELATED APPLICATION

This is a national phase national application of an international patent application number PCT/CN2014/076911 with a filing date of May 6, 2014, which claimed priority of one foreign application which is filed in China: application number 201310187886.0 and filing date May 20, 2013. The contents of these specifications, including any intervening amendments thereto, are incorporated herein by reference.

BACKGROUND OF THE PRESENT INVENTION

Field of Invention

The present invention relates to a measurement and control system for Multi-axis supported floatation platform, which belongs to the technical field of ultra-precision instrument and equipment platform.

Description of Related Arts

Nowadays, platforms at high level are needed frequently. For examples, in physical simulation experiments for space rendezvous and docking, ground measurement, navigation, network communication, formation control and etc., support is required for the entire ground emulator for providing a basic platform for the ground simulation experiments, and for providing a support platform for physical simulation experiments in relation to ground test verification for formation of satellite and verification analysis for control algorithm. Since the platform at both dynamic or static states may be in an inclined state due to the unevenness of the large surface level base platform, which is unfavorable for providing a level working platform for the loading to ensure accurate docking, it is required to level the platform speedily and accurately at both dynamic or static states so as to ensure that sufficient degree of levelness is maintained.

In the present technology, there are work platforms which utilized different kinds of leveling mechanisms in which the leveling mechanisms are based on gravity (weight) leveling mechanism, four-rod leveling mechanism, and isovolumetric hydraulic leveling mechanism. However, the above leveling mechanisms have a number of drawbacks, such as:

(1) The gravity (weight) leveling mechanism processes leveling of the work platform based on weight and is composed of the work platform and the frame. This type of leveling is unstable, its safety coefficient is low and the comfort level for the operators is low.

(2) The four-rod leveling mechanism utilizes the physical properties of the four rods for leveling the work platform and the disadvantages are inapplicable to telescopic arms and narrow application range.

(3) The isovolumetric hydraulic leveling mechanism utilizes passive cylinder installed on the luffing arm and isovolumetric leveling hydraulic cylinder installed on the work platform for leveling the work platform, which includes work platform, passive cylinder and isovolumetric leveling hydraulic cylinder. The disadvantages are inapplicable to multi-staged telescopic arms and narrow application range.

Accordingly, there is an urgent need to provide a system platform which is capable of maintaining a level state for the work platform through adjustment by a leveling system under any conditions.

SUMMARY OF THE PRESENT INVENTION

An objective of the present invention is to solve the problems of limited leveling operation state of the support platform and narrow application range by providing a measurement and control system for multi-axis supported floatation platform.

The measurement and control system for multi-axis supported floatation platform according to the preferred embodiment of the present invention processes measurement and control of the multi-axis supported floatation platform, the multi-axis floatation platform includes a load platform, M number of support legs, M number of floatation cylinders and M number of gas bearings, where M is 3, 4, 5, 6, 7 or 8, the load platform is a circular platform, the load platform is supported by M number of support legs, the M number of support legs are connected to M number of connecting points at the bottom surface of the load platform such that a regular M-polygon is constructed, each support leg has one end connected to a floatation cylinder, each floatation cylinder has a bottom end connected to one gas bearing through floatation ball bearing, the measurement and control system includes a load feedback unit, an execution unit, a position measurement unit, a safety unit, a control, a rotary motor and a linear light source, the load feedback unit comprises M number of pressure sensors and four differential sensors; the execution unit comprises M number of servo voice coil motors and M number of servo voice coil motor drivers, the position measurement unit comprises a plane grating, M number of linear gratings, a CCD linear array, an inclination sensor, M number of electronic levels and an indoor GPS; the safety unit comprises 2M number of proximity sensors and M number of temperature sensors; the CCD linear array is formed by not less than six CCDs, the multi-axis floatation platform is arranged on a circular concrete base, all the CCDs of the CCD linear array are positioned uniformly along the circumferential direction of the circular concrete base, the load platform comprises a rotary motor, the rotary motor has a top surface at which the linear light source is positioned, each support leg has an inner portion in which one pressure sensor, one servo voice coil motor and one linear grating are arranged, the pressure sensor is arranged for measuring the torque of the corresponding support leg, the servo voice coil motor is arranged for driving the extension and retraction movement of the corresponding support leg, each servo voice coil motor is driven by one servo voice coil motor driver, the linear grating is arranged for collecting the displacement produced through the support leg driven by the servo voice coil motor, the four differential sensors are uniformly distributed along the circumferential direction of the load platform on the outer edge of the top surface of the load platform, the differential sensors are arranged for measuring the relative position between the load platform and the load on the load platform, the plane grating is installed on the top surface of the load platform, the plane grating is arranged for measuring the relative displacement amount of the load on the load platform occurred at the two relative perpendicular direction. with respect to the load platform, the inclination sensor and the M number of electronic levels are mounted onto the top surface of the load platform, the inclination sensor is arranged for measuring the vibration angle of the load platform along the X-direction and Y-direction of the spatial coordination system during the process of movement, the M number of electronic levels are corresponded to the positions of the M number of connecting points between the bottom surface of the load platform and the M number of support legs, the electronic levels are arranged for measuring the stationary state of the load platform, the indoor GPS is mounted on an upper position relative to the circular concrete base and is arranged for measuring the position coordinates of the load platform on the circular concrete base, each of the support leg has an upper displacement limit and a lower displacement limit of its inner portion and one proximity sensor is provided at each of the position of the upper and lower displacement limit respectively, the proximity sensor is arranged for providing real-time position limit alert, each servo voice coil motor comprises one temperature sensor at its inner portion, the temperature sensor is arranged for providing real-time temperature alert, the pressure sensor has a pressure signal output terminal connected to the pressure signal input terminal of the control, the differential sensor has a position signal output terminal connected to the position signal input terminal of the control, the control has an actuating control signal output terminal connected to the actuating control signal input terminal of the servo voice coil motor driver, the servo voice coil motor driver has an actuating signal output terminal connected to the actuating signal input terminal of the servo voice coil motor, the servo voice coil motor has an actuating signal output terminal connected to the actuating signal input terminal of the support leg, the plane grating has a relative position displacement signal output terminal connected to the relative position displacement signal input terminal of the control, the linear grating has a support leg position displacement signal output terminal connected to a support leg position displacement signal input terminal of the control, the CCD liner array has a monitor signal output terminal connected to the monitor signal input terminal of the control, the inclination sensor has an inclination signal output terminal connected to the inclination signal input terminal of the control, the electronic level has a level signal output terminal connected to the level signal input terminal of the control, the indoor GPS has a GPS signal output terminal connected to a GPS signal input terminal of the control, the temperature sensor has a temperature signal output terminal connected to the temperature signal input terminal of the control, the proximity sensor has a position limit signal output terminal connected to the position limit signal input terminal of the control, the measurement and control system further comprises a host computer and a status display board, the host computer has a signal transmission terminal connected to the signal transmission terminal of the control, the host computer has a display signal output terminal connected to the display signal input terminal of the status display board, the M number of support legs are three support legs, the radius of the load platform is 2 m, the three support legs connected to the bottom surface of the load platform through three connecting points to form an equilateral triangle, the distance between the vertex of the equilateral triangle and the center of the load platform is 1.4 m.

The advantages of the present invention is as follows: the present invention can be used in simulation system for space rendezvous and docking, or any other systems with requires a leveling system. The floatation platform of the present invention is advantageous in having great load-bearing capacity, high precision in leveling, and short adjustment time; the floatation platform, through cooperating with the leveling measurement and control system, has self-adjusting function in the process of operation, and is capable of increasing the precision level of leveling, stability and reliability.

The multi-axis supported floatation platform according to the preferred embodiment of the present invention can provide a highly leveled work platform for loading speedily and accurately based on the actual demand, and belongs to the technical field of ultra-precision instrument and equipment. The present invention provides high precision, leveled, and large-area work platform for practical engineering applications. The loading platform on the large-area level base can ensure high precision in leveling both in dynamic and in static state.

DETAILED DESCRIPTION OF THE PREFERRED EMBODIMENT

Embodiment 1

Figure 1:
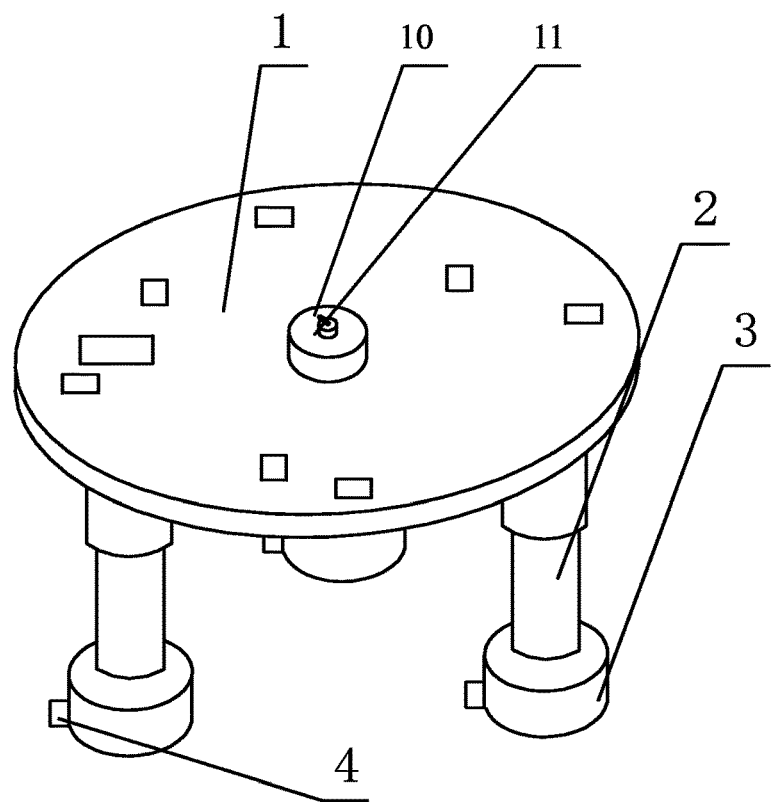
FIG. 1 is a structural illustration of the multi-axis supported floatation platform according to a preferred embodiment of the present invention.

This embodiment is further described in connection with FIG. 1 to FIG. 9 as follows. The measurement and control system for multi-axis supported floatation platform of this embodiment carries out the measurement and control process for the multi-axis supported floatation platform. The multi-axis floatation platform includes a load platform 1, M number of support legs 2, M number of floatation cylinders 3 and M number of gas bearings 4, where M is 3, 4, 5, 6, 7 or 8.

The load platform 1 is a round platform. The load platform 1 is supported by M number of support legs 2. The M number of support legs 2 are connected to M number of connecting points at the bottom surface of the load platform 1 such that a regular M-polygon is constructed.

Each support leg 2 has one end connected to a floatation cylinder 3. Each floatation cylinder 3 has a bottom end connected to one gas bearing 4 through floatation ball bearing.

The measurement and control system includes a load feedback unit 5, an execution unit 6, a position measurement unit 7, a safety unit 8, a control 9, a rotary motor 10 and a linear light source 11.

The load feedback unit 5 comprises M number of pressure sensors 5-1 and four differential sensors 5-2; the execution unit 6 comprises M number of servo voice coil motors 6-1 and M number of servo voice coil motor drivers 6-2. The position measurement unit 7 comprises a plane grating 7-1, M number of linear gratings 7-2, a CCD linear array, an inclination sensor 7-4, M number of electronic levels 7-5 and an indoor GPS 7-6; the safety unit 8 comprises 2M number of proximity sensors 8-1 and M number of temperature sensors 8-2; the CCD linear array is formed by not less than six CCDs.

The multi-axis floatation platform is arranged on a circular concrete base, all the CCDs of the CCD linear array are positioned uniformly along the circumferential direction of the circular concrete base, the load platform 1 comprises a rotary motor 10, the rotary motor 10 has a top surface at which the linear light source 11 is positioned.

Each support leg 2 has an inner portion in which one pressure sensor 5-1, one servo voice coil motor 6-1 and one linear grating 7-2 are arranged. The pressure sensor 5-1 is arranged for measuring the torque of the corresponding support leg 2. The servo voice coil motor 6-1 is arranged for driving the extension and retraction movement of the corresponding support leg 2. Each servo voice coil motor 6-1 is driven by one servo voice coil motor driver 6-2. The linear grating 7-2 is arranged for collecting the displacement produced through the support leg 2 driven by the servo voice coil motor 6-1.

The four differential sensors 5-2 are uniformly distributed along the circumferential direction of the load platform 1 on the outer edge of the top surface of the load platform 1. The differential sensors 5-2 are arranged for measuring the relative position between the load platform 1 and the load on the load platform 1.

The plane grating 7-1 is installed on the top surface of the load platform 1. The plane grating 7-1 is arranged for measuring the relative displacement amount of the load on the load platform occurred at the two relative perpendicular direction with respect to the load platform.

The inclination sensor 7-4 and the M number of electronic levels 7-5 are mounted onto the top surface of the load platform 1. The inclination sensor 7-4 is arranged for measuring the vibration angle of the load platform 1 at the X-direction and Y-direction of the spatial coordination system during the process of movement. The M number of electronic levels 7-5 are corresponded to the positions of the M number of connecting points between the bottom surface of the load platform 1 and the M number of support legs 2. The electronic levels 7-5 are arranged for measuring the stationary state of the load platform 1.

The indoor GPS 7-6 is mounted on an upper position relative to the circular concrete base and is arranged for measuring the position coordinates of the load platform 1 on the circular concrete base.

Each of the support leg 2 has an upper displacement limit and a lower displacement limit of its inner portion and one proximity sensor 8-1 is provided at each of the position of the upper and lower displacement limit respectively. The proximity sensor 8-1 is arranged for providing real-time position limit alert. Each servo voice coil motor 6-1 comprises one temperature sensor 8-2 at its inner portion. The temperature sensor 8-2 is arranged for providing real-time temperature alert.

The pressure sensor 5-1 has a pressure signal output terminal connected to the pressure signal input terminal of the control 9. The differential sensor 5-2 has a position signal output terminal connected to the position signal input terminal of the control 9. The control 9 has an actuating control signal output terminal connected to the actuating control signal input terminal of the servo voice coil motor driver 6-2. The servo voice coil motor driver 6-2 has an actuating signal output terminal connected to the actuating signal input terminal of the servo voice coil motor 6-1. The servo voice coil motor 6-1 has an actuating signal output terminal connected to the actuating signal input terminal of the support leg 2.

The plane grating 7-1 has a relative position displacement signal output terminal connected to the relative position displacement signal input terminal of the control 9. The linear grating 7-2 has a support leg position displacement signal output terminal connected to a support leg position displacement signal input terminal of the control 9. The CCD liner array 7-3 has a monitor signal output terminal connected to the monitor signal input terminal of the control 9. The inclination sensor 7-4 has an inclination signal output terminal connected to the inclination signal input terminal of the control 9. The electronic level 7-5 has a level signal output terminal connected to the level signal input terminal of the control. The indoor GPS 7-6 has a GPS signal output terminal connected to a GPS signal input terminal of the control 9.

The temperature sensor 8-2 has a temperature signal output terminal connected to the temperature signal input terminal of the control 9. The proximity sensor 8-1 has a position limit signal output terminal connected to the position limit signal input terminal of the control 9.

According to this embodiment, the gas bearing 4 comprises a nozzle. The load platform 1 utilizes the gas bearings 4 to float on top of the horizontal concrete base. The gas jet effect of the nozzle of the gas bearing 4 is used for providing translational motion of the load platform 1 on the base.

Figure 5:
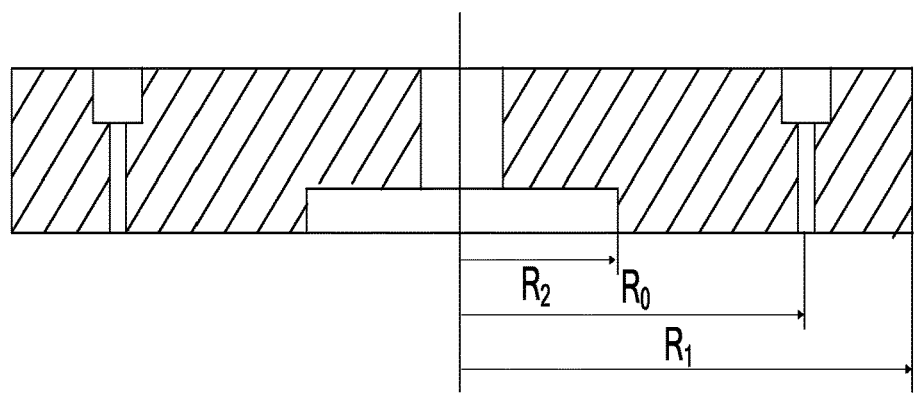
FIG. 5 is a sectional view of FIG. 4.
Figure 6:
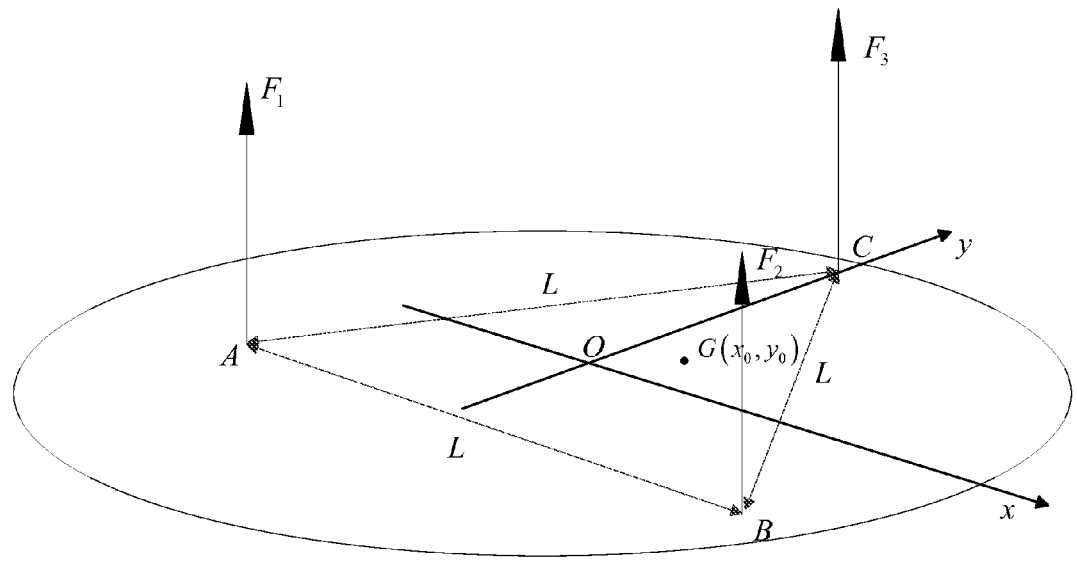
FIG. 6 is a coordinates illustration of the centroid shifting position of the entire floatation platform with loading according to a preferred embodiment of the present invention.

According to this embodiment, the gas bearing 4 is hydrodynamic gas bearing. The load platform 1 relies on the M number of gas bearings 4 for support. In order to ensure uniform force distribution, each of the M number of gas bearings has the same structural construction and the distance from the center are the same. Referring to FIG. 5 of the drawings, the gas bearing 4 has a lower end defining a ring-shaped structure in which the outer radius is $R_1$, the inner radius is $R_2$. The nozzle is distributed along the circumference with the radius $R_0$.

Embodiment 2

This embodiment is further described in connection with FIG. 9 as follows. This embodiment provides further description for embodiment 1. According to this embodiment, the measurement and control system further comprises a host computer 12 and a status display board 13.

The host computer 12 has a signal transmission terminal connected to the signal transmission terminal of the control 9. The host computer 12 has a display signal output terminal connected to the display signal input terminal of the status display board 13.

Embodiment 3

This embodiment is further described in connection with FIG. 1 to FIG. 10 as follows. This embodiment provides further description for embodiment 1 or 2. According to this embodiment, the M number of support legs 2 are three support legs, the radius of the load platform 1 is 2 m, the three support legs 2 connected to the bottom surface of the load platform 1 through three connecting points to form an equilateral triangle, the distance between the vertex of the equilateral triangle and the center of the load platform 1 is 1.4 m.

Figure 3:
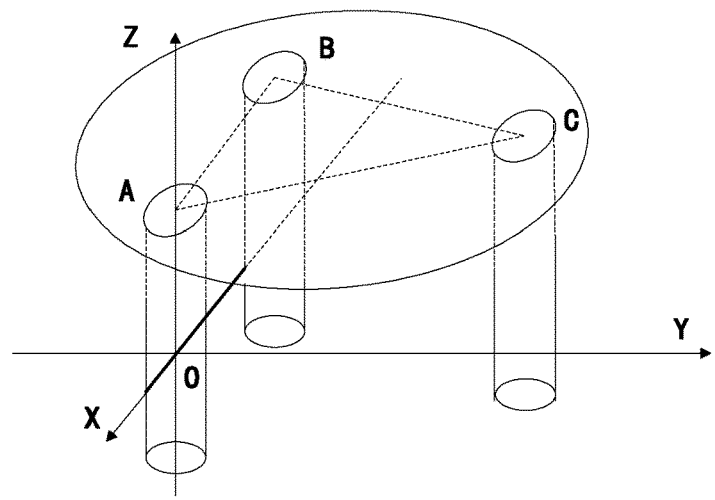
FIG. 3 is a state illustration of the connection between the load platform and three support legs according to a preferred embodiment of the present invention.
Figure 4:
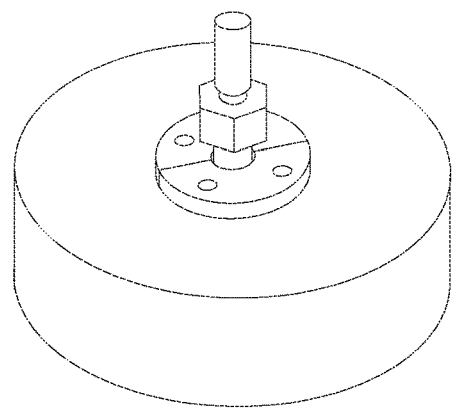
FIG. 4 is an illustration of the gas bearing according to a preferred embodiment of the present invention.

As shown in FIG. 3 of the drawings, the support legs 2 of the multi-axis supported floatation platform and the three connecting points A, B and C of the bottom surface of the load platform 1 forms an equilateral triangle and the length of each side is L=2424 mm. The gas bearings 4 utilizes compressed air to form a film between the floatation ball bearings and ball sleeves to realize the approximate frictionless motion, so as to simulate the dynamical environment in which minimal disturbance torques is exerted onto the spacecraft in the outer space.

Figure 2:
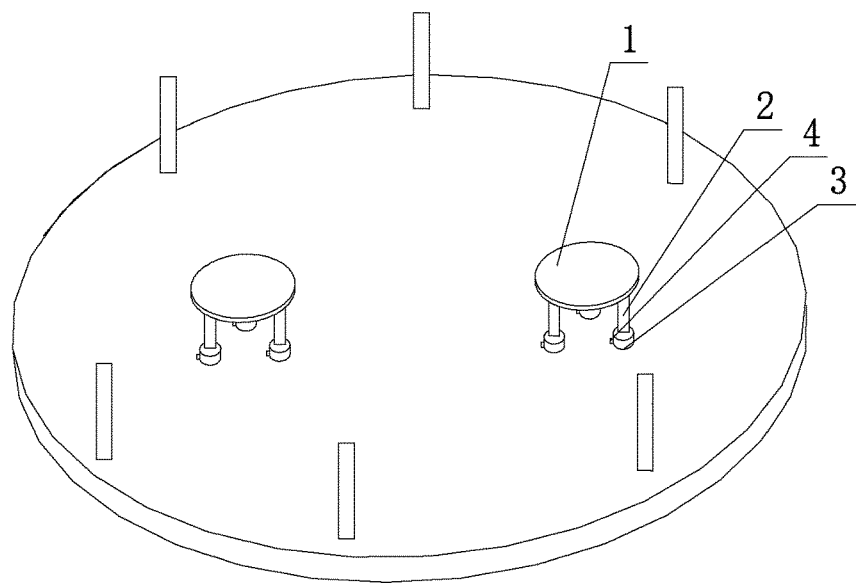
FIG. 2 is a structural illustration of the multi-axis supported floatation platform being positioned on the level concrete base according to a preferred embodiment of the present invention.

According to FIG. 1 to FIG. 3 of the drawings, if the radius of the load platform 1 is 2 m, through processing finite element analysis, the distance between the vertex of the equilateral triangle formed by the interception of the load platform 1 and the three support legs 2 at the connecting points A, B and C and the center of the load platform 1 is 1.4 m. No deformation around the load platform 1 is observed.

The support legs 2 are telescopic adjustable support legs.

According to the present invention, as shown in FIG. 3, each of the support legs 2 has an inner portion at which the servo voice coil motor 6-1 is installed. The servo voice coil motor 6-1 is driven by the servo voice coil motor driver 6-2 and the servo voice coil motor 6-1 is an execution device. According to the present invention, high frequency servo voice coil motor is preferred as the execution device. The servo voice coil motor can be used to compensate the amplitude of the load platform 1 at points A, B and C during the vibration process. The quantity of telescopic movement of the support legs 2 is compensated through controlling the three servo voice coil motor such that the object of stabilizing the load platform 1 is achieved.

The principle of the servo voice coil motor is that force is produced through the powered coil in a magnetic field, therefore the servo voice coil motor has the advantages of zero magnetic hysteresis, zero magnetic groove effect, high frequency, high precision, high acceleration, high speed, good force properties, easy to control, small size and high resolution. Based on the configuration level for driving, feedback, control and control algorithms, the voice coil motor generally can reach a frequency of movement of 500-1000 Hz or even higher. The use of voice coil motor for driving movement can eliminate the gap effect between segments in traditional driving movement.

The differential sensor 5-2 is arranged for measuring the relative position between the load platform 1 and the load on the load platform, and providing position information of the translational movement of the load platform 1 on the circular horizontal concrete base. The pressure sensor 5-1 measures the force of the support legs so as to avoid overload of the servo voice coil motor through preventing the forcing movement of the support legs 2 by the servo voice coil motor 6-1 to occur when the support legs 2 are jammed due to internal failure or other external factors. The proximity sensor 8-1 provides real-time position limit alert when the servo voice coil motor exceeds its limits. The temperature sensor 8-2 provides temperature alert when the temperature of the servo voice coil motor is too high and exceeds its tolerance range. Then the system can provide response accordingly. The safety unit 8 is arranged for ensuring the safe operation of hardware during operation of the measurement and control system.

Liner gratings 7-2 is a contact-less gratings, the linear gratings 7-2 are arranged for collecting position shifting signal of the servo voice coil motor and providing feedback to the control; the plane grating 7-1 measures and obtains the relative position shifting amount the loading on the load platform relative to the load platform along their perpendicular direction, which is used for calculating the centroid shifting interference caused by their relative position shift.

When the rotary motor 10 drives the rotation of the linear light source 11, dynamic leveling inclination measurement system is constructed through the CCD linear array 7-3 and the indoor GPS 7-6 for measuring and providing feedback of the inclination angle of the load platform 1 during the dynamic process. The CCD linear array 7-3 includes all the CCD which is uniformly positioned along the circumferential direction of the circular level concrete base. This arrangement can reduce the light blocking effect of an object, which may block the light to reach some of the CCDs, and lead to the incompleteness of the inclination information and adversely affect the leveling of the load platform 1.

The inclination sensor 7-4 is a biaxial inclination sensor which is capable of obtaining the inclination angle of the multi-axis supported floatation platform in dynamic or in static state, and serving the monitoring of the platform inclination and protection against exceeding inclination threshold, therefore ensuring that the inclination of the load platform 1 is maintained within the range under the monitoring of CCD linear array.

The host computer 12 and the status display board 13 is connected through Ethernet. The status display board 13 is arranged for real-time display of status information such as the state of each of the support legs, the temperature of the servo voice coil motor and etc.

Referring to FIG. 3 of the drawings, define Z-direction as the perpendicular direction to the ground level, then define X- and Y-direction according to the right-hand rule. Rx, Ry and Rz are the rotational direction of the load platform 1 along the X, Y and Z direction respectively. The floatation ball bearings of the gas bearings 4 can realize the support of the free rotation with limited swing angle for the load platform 1 at Rx direction, Ry direction and Rz direction. The servo voice coil motor realizes the unloading of gravitational force which includes the weight of the floatation ball bearings and the load platform 1 and ensures that the long distance free floatation of the load platform along the Z-direction. X, Y and Z axes can realize long distance free movement. Rz axis can achieve 0-360° free rotational movement along the Z axis. Rx and Ry axis can achieve −30-30° free rotational movement along the X and Y axis respectively. The load platform 1 requires 6 levels of freedom. The gas bearing 4 can realize two-dimensional free translation motion on the circular horizontal concrete base. During the stabilizing and adjustment process of the load platform 1, when a height level of the load platform does not require any adjustment, as shown in FIG. 3, point A is the reference point for establishing the origin of the coordinate system, the stability is primarily achieved through adjusting the Z coordinates of point B and C.

Figure 9:
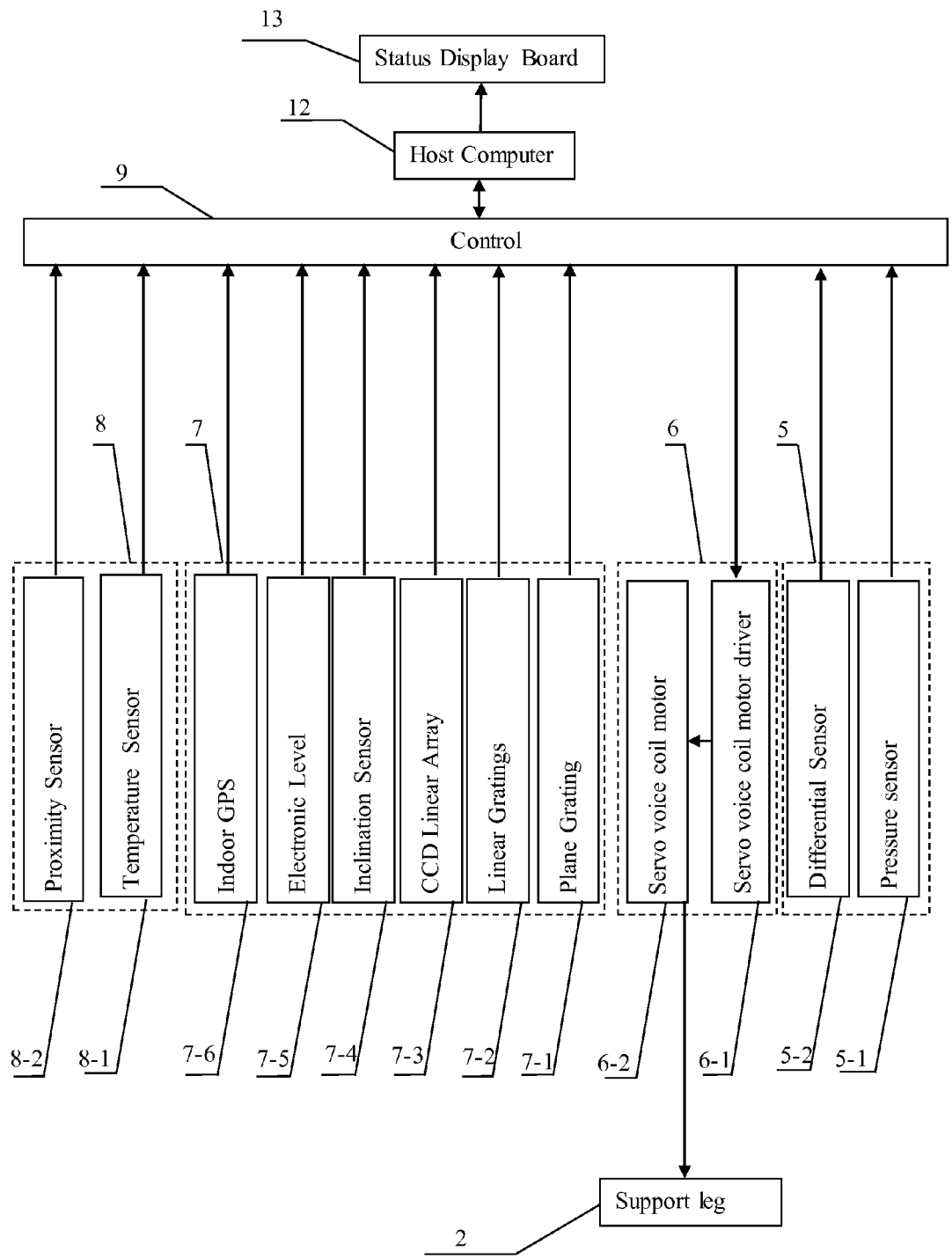
FIG. 9 is a control framework of the measurement and control system for leveling according to a preferred embodiment of the present invention.
Figure 10:
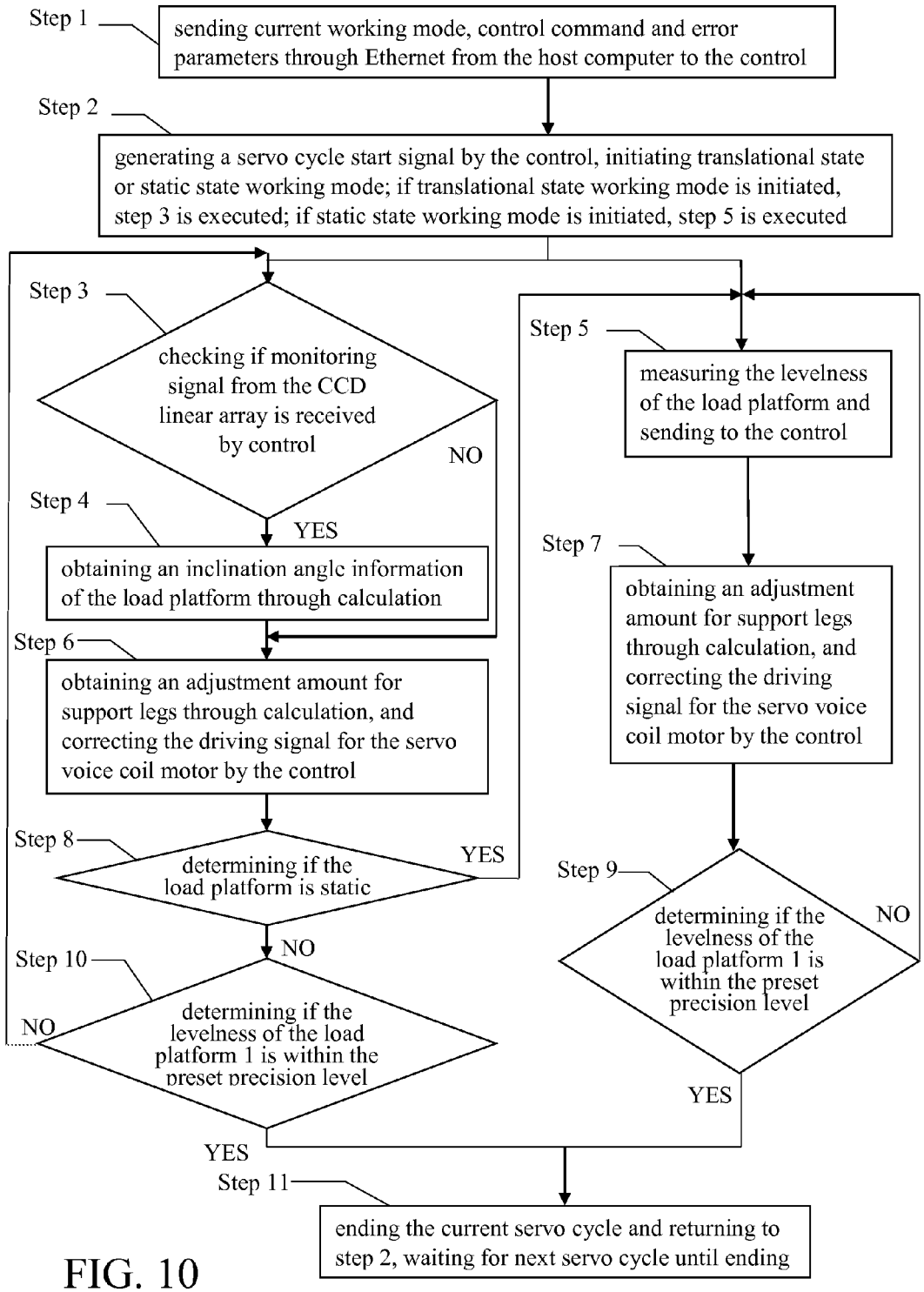
FIG. 10 is a flowchart showing the leveling method of the multi-axis supported floatation platform according to a preferred embodiment of the present invention.

The measurement and control system for multi-axis supported floatation platform is a real-time dynamic leveling system and its control framework is illustrated in FIG. 9 of the drawings. The measurement and control system has a bicyclic structure. The inner cycle comprises a position control ring for three servo voice coil motors, its input signal is the three-dimensional vector constructed through the amount of displacement required for leveling each of the support legs 2. The outer cycle comprises an angle control ring, its signal input is two-dimensional zero vector. Both the position control and the angle control of the measurement and control system utilize a closed-loop control. The position control ring comprises the position ring control, motor driver, voice coil motor and linear gratings of the three support legs 2, wherein the position feedback is realized through the control of the linear gratings. The angle control ring mainly comprises angle ring control, inclination sensors, CCD linear array and indoor GPS. Wherein the output angle of the load platform 1 comprises two feedback channels: the first feedback channel provides feedback directly from the measuring results of the inclination sensors; and the second feedback channel provides feedback through calculating the inclination angle of the platform from the measuring results obtained from the CCD linear array and the indoor GPS. Since the dynamic leveling function of the load platform 1 is realized through controlling the voice coil motor on the three support legs 2, the output control amount of the angle control ring control requires solution processing to obtain the position control input amount of the three voice coil motor, that is processing transformation through converting inclination displacement to matrix. When CCD linear array and indoor GPS are used for feedback processing, the height of light spot output from the CCD linear array is combined with the coordinates of the load platform measured by indoor GPS for calculation process to obtain the current inclination angle of the load platform, which is processing transformation through height inclination transformation matrix.

The composition and effect of interference signal of the multi-axis supported floatation platform are analyzed as follows. The interference signal includes centroid shift interference and ground flatness interference. The ground flatness interference usually is small amplitude, low frequency sine wave signal. The followings are mainly the analysis of the effect of centroid shift interference.

The centroid shift interference generally includes two aspects: first, induced changes to the loading of the voice coil motor; and second, effect on the height of the film of each gas bearings 4. Because the load of the voice coil motor on the three support legs 2 is the distributed load of the load platform to each of the support legs 2, when centroid shift is caused by the relative position change of the device on the load platform 1, the load on each of the particular voice coil motor will change accordingly, so the effect of centroid shift to changes of loading on each particular voice coil motor must be considered The measurement and monitoring method of permissible interference by centroid shift for the multi-axis floatation platform includes the steps of: first setting a centroid shift threshold value, then comparing the centroid shift amount $G(x_0, y_0)$ and threshold value, if the centroid shift amount $G(x_0, y_0)$ is greater than the centroid shift threshold value, the telescopic length of the support legs 2 are adjusted through the following method:

The method of obtaining the centroid shift amount $G(x_0, y_0)$: defining the center of the load platform 1 as the origin to construct both sides of Cartesian coordinates system. The centroid coordinates of the load platform 1 is (0, 0), the centroid coordinates of the sum of the load platform 1 and the loading on the load platform 1 is $G(x_0, y_0)$, where $x_0$ refers to the coordinate along the y-axis direction of the centroid shift amount $G(x_0, y_0)$, where $y_0$ refers to the coordinate along the y-axis direction of the centroid shift amount $G(x_0, y_0)$, the relative shift amount $(x_2, y_2)$ between the load on the load platform and the load platform 1 is measured by plane gratings 7-1 to obtain:

$$\begin{cases} x_0 = \frac{M_1 x_1 + M_2 x_2}{M_1 + M_2} = \frac{M_2 x_2}{M_1 + M_2} \\ y_0 = \frac{M_1 y_1 + M_2 y_2}{M_1 + M_2} = \frac{M_2 y_2}{M_1 + M_2} \end{cases},$$

In the formula, $M_1$ refers to the centroid amount of the load platform 1, $M_2$ refers to the centroid amount of the load on the load platform 1;

The method of obtaining the effect of the centroid shift amount $G(x_0, y_0)$ on the height of the film of the gas bearings are described as follows:

Define the connecting points between the three support legs 2 and the bottom surface of the load platform 1 as point A, B and C, where the coordinates of A is $$\left(-\frac{1}{2}L, -\frac{\sqrt{3}}{6}L\right),$$

B is $$\left(-\frac{1}{2}L, -\frac{\sqrt{3}}{6}L\right),$$

C is $$\left(0, \frac{\sqrt{3}}{3}L\right),$$

where L refers to the length of the side of the equilateral triangle formed by the three connecting points A, B and C, When the floatation platform is under static equilibrium, according to the principal vector system of forces and the principal moment of the coordinate axes is zero, obtain:

$$\begin{cases} \sum F_i = 0 \\ \sum M_x(F_i) = 0 \\ \sum M_y(F_i) = 0 \end{cases}$$

Where i=1, 2 and 3, $F_1$ refers to the load on the support leg 2 at point A, $F_2$ refers to the load on the support leg 2 at point B, $F_3$ refers to the load on the support leg 2 at point C; $M_x(F_i)$ refers to the equivalent torque of the load $F_i$ along the x-axis, $M_y(F_i)$ refers to the equivalent torque of the load $F_i$ along the y-axis, Substitute the coordinates of points A, B and C into the above formula and obtain:

$$\begin{cases} F_1 + F_2 + F_3 - G = 0 \\ -(F_1 + F_2)\dfrac{\sqrt{3}}{6}L + F_3 \dfrac{\sqrt{3}}{3}L - G \cdot y_0 = 0 \\ F_1 \dfrac{1}{2}L - F_2 \dfrac{1}{2}L + G \cdot x_0 = 0 \end{cases}$$

Solve the above formula, obtain the values of $F_1$, $F_2$, $F_3$:

$$\begin{cases} F_1 = \dfrac{G}{3} \dfrac{\sqrt{3}\, x_0 - y_0}{\sqrt{3}\, L} \cdot G \\ F_2 = \dfrac{G}{3} \dfrac{\sqrt{3}\, x_0 + y_0}{\sqrt{3}\, L} \cdot G, \\ F_3 = \dfrac{G}{3} \dfrac{2 y_0}{\sqrt{3L}} \cdot G \end{cases}$$

Accordingly, obtain the current loading mass $m_1$ of the support leg at point A, the current loading mass $m_2$ of the support leg at point B, the current loading mass $m_3$ of the support leg at point C, the relationship between the centroid $G(x_0, y_0)$ and $m_1$, $m_2$, and $m_3$ are:

$$\begin{cases} m_1 = \dfrac{M}{3} \dfrac{\sqrt{3}\, x_0 - y_0}{\sqrt{3}\, L} \cdot M \\ m_2 = \dfrac{M}{3} \dfrac{\sqrt{3}\, x_0 + y_0}{\sqrt{3}\, L} \cdot M, \\ m_3 = \dfrac{M}{3} \dfrac{2 y_0}{\sqrt{3L}} \cdot M \end{cases}$$

Where M is the total mass of the load platform 1 and the loading on the load platform 1;

Finally, the matrix of the centroid shift amount $G(x_0, y_0)$ and the height of the film of the gas bearings 4 are obtained:

$$\begin{bmatrix} h_1 \\ h_2 \\ h_3 \end{bmatrix} = \begin{bmatrix} \dfrac{G}{LJ} & -\dfrac{G}{\sqrt{3}\,LJ} \\ -\dfrac{G}{LJ} & \dfrac{G}{\sqrt{3}\,LJ} \\ 0 & \dfrac{2G}{\sqrt{3}\,LJ} \end{bmatrix} \cdot \begin{bmatrix} x_0 \\ y_0 \end{bmatrix} + \dfrac{G}{3J},$$

where $h_1$ is the height of the film of the gas bearing at the bottom portion of the support leg 2 at point A, $h_2$ is the height of the film of the gas bearing at the bottom portion of the support leg 2 at point B, $h_3$ is the height of the film of the gas bearing at the bottom portion of the support leg 2 at point C, G is the total mass of the load platform 1 and the loading on the load platform 1, J is the film rigidity of the gas bearing at the bottom portion of the support leg;

The effect of changes in the height of the film of the gas bearings on the changes in the height of the support leg 2 is obtained through the measuring signals from the inclination sensors 7-4 or the CCD linear array 7-3. The signals are processed to obtain the information of the inclination angle interference of the load platform 1 caused by the centroid shift amount $G(x_0, y_0)$. Through the information of the inclination angle interference of the load platform 1, the required position shifting amount for leveling each of the particular support legs 2 is obtained, thereby the measurement and monitoring of permissible interference by centroid shift for the floatation platform is achieved.

In the above measurement and monitoring method of permissible interference by centroid shift for the multi-axis floatation platform, the centroid coordinates of the load platform 1 is (0, 0), which is obtained by approximation and the effect of the loading on the load platform is neglected, and is arranged for obtaining the permissible shifting range of the loading on the load platform through experiments, so as to ensure that the centroid shifting amount caused from the leveling process is within the permissible range.

The relationship between the centroid coordinates $G(x_0, y_0)$ and the height of the film of the gas bearings 4 reflects the effect of the centroid shifting on the height of the film, and the effect is directly illustrated in the height of each of the support leg 2 and its ultimate effect is affecting the inclination angle of the surface of the load platform 1. The inclination information of the load platform 1 is obtained through the measurement and output from the inclination sensor or through calculation of the light point measurement data from the CCD linear array. Accordingly, the interference caused by centroid shifting on the inclination angle of load platform 1 is included in the inclination information of the inclination feedback channel, the control 9 can directly obtain the feedback through the inclination sensors or the CCD linear arrays. Then, the control 9 performs data processing to obtain the position shifting amount required by each of the particular support legs 2, and processes servo control of the motor to achieving leveling.

Because the interference caused by centroid shifting is reflected in the inclination angle measurement of the voice coil motor loading and the load platform 1, therefore, when the centroid shifting is greater than a certain level, the load changes of the voice coil motor will be relatively large. On the other side, the interference to the inclination angle of the platform will also be relatively large, and may cause unsatisfactory results to the self-leveling control system. Accordingly, repetitive experiments can be performed to obtain the maximum position shifting amount of the load platform and the permissible loading on the self-leveling control platform. Then, through installation of adjustable spacing device on the load platform, the position movement of the loading is limited, thereby the interference caused by relative position shifting of centroid shifting can be maintained within the permissible range. This serves a monitoring function to the centroid shifting problem and ensures that a relatively satisfactory control function is provided by the measurement and control system for the multi-axis supported floatation platform.

Working Principle:

Place the multi-axis supported floatation platform on the large circular level concrete base, when the multi-axis supported floatation platform is under static state, the multi-axis supported floatation platform utilizes the electronic levels located on the load platform 1 and the CCD linear array located on the level concrete base together with the indoor GPS to measure and obtain its levelness through calculation. The linear light source on the load platform 1 is rotated speedily through the rotary motor. In the light beam scanning process of this light source, CCD linear array can calculate the pitch angle of the load platform 1 based on the recorded light spot locations, and provide feedback information to the control.

The real-time measurement of the height of the light spot is carried out by the CCD linear array around the concrete base. The real-time measurement of the position information of the load platform 1 in concrete base is carried out by the indoor GPS. When the rotating light source is scanning across two adjacently positioned CCD linear array at high speed, the photoelectric position of the two adjacently positioned CCDs and the light source form a plane, which is shown in the plane α in FIG. 8. Since the speed of the rotating light source is relatively higher, the time interval of scanning between the two adjacently positioned CCDs is extremely small, therefore the plane α can be approximate to the current plane of the load platform 1. Accordingly, the coordinates of the light spots of the two adjacently positioned CCDs and the coordinates of the location of the load platform 1 can be feedback to the control through the CCD linear array and the indoor GPS. Then, the control can obtain the inclination of the load platform at two perpendicular direction through geometric conversion, process resolving the inclination information to obtain the actual position shifting amount of each of the support legs 2, drive the movement of the support legs 2 through controlling the servo voice coil motor to an upward movement or a downward movement for providing corresponding compensation and adjusting the levelness of the load platform 1. The servo voice coil motor utilizes the data measured by contactless gratings to ensure the accuracy of the position shifting and hence to ensure the accuracy of positioning of the support legs 2. During the process, the load feedback unit and the safety unit can provide real-time measurement and monitor the status of the multi-axis supported floatation platform, and provide a timely response. The load platform 1 in dynamic state, through the same method as in the static state, control the driving movement of the support leg to provide corresponding compensation to position shifting amount based on the collected data, therefore ensuring the leveling accuracy of the load platform.

Figure 7:
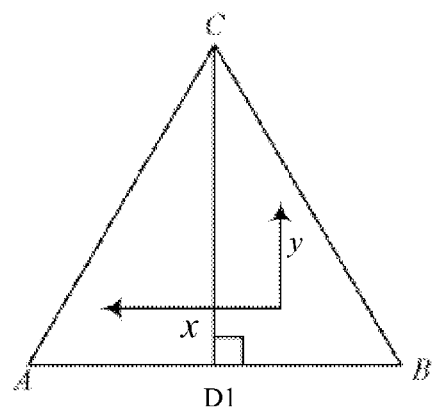
FIG. 7 is an illustration of the arrangement of the inclination sensors in relation to the three support legs.
Figure 8:
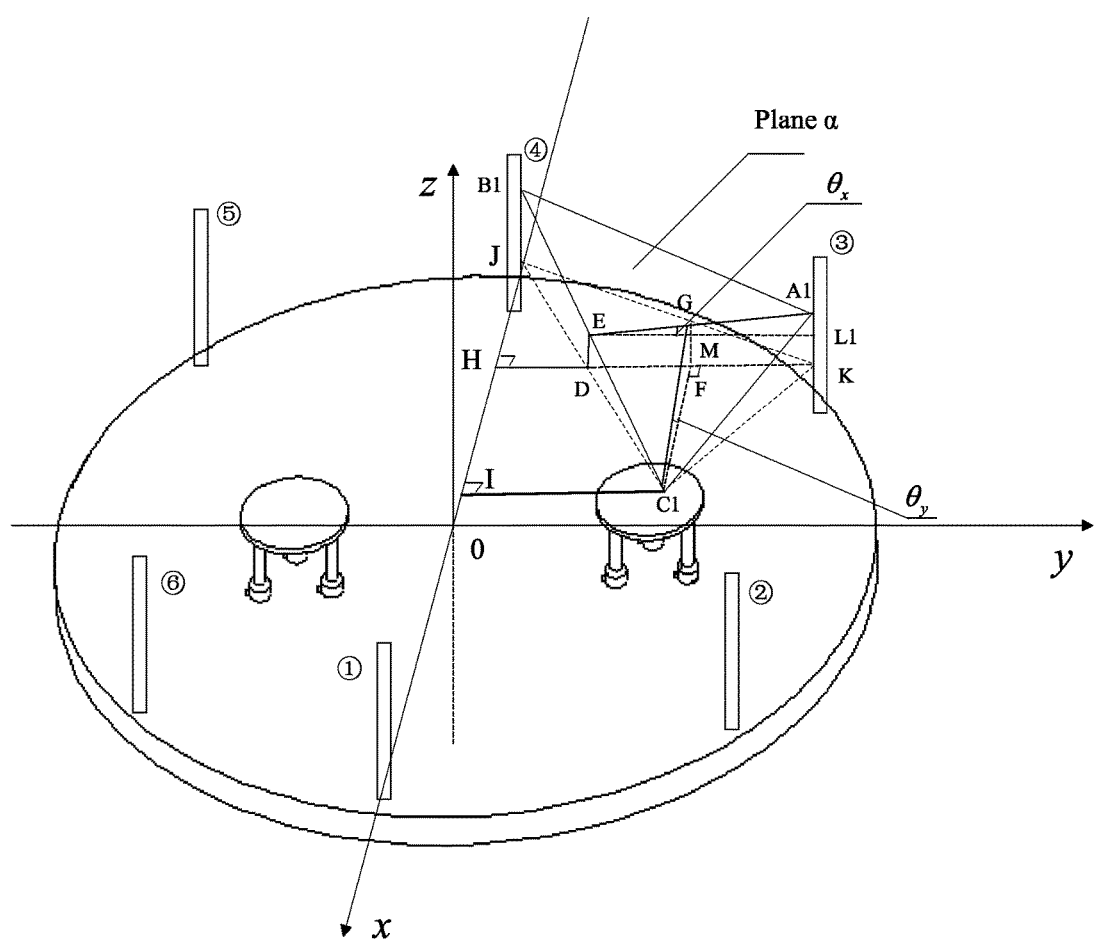
FIG. 8 is an illustration of calculation of platform inclination angle through CCD linear array.

To adjust the extended length of the three support legs 12 to achieve leveling of the load platform 1, the installation method of the inclination sensor and its position relationship with the three support legs 3 are illustrated in FIG. 7. The inclination sensor and the two perpendicular axes, which is x- and y-axis are parallel to AB and CD1 respectively.

When the load platform 1 is under static state, the control outputs standstill mode and enters servo cycle. The rotary motor drives the linear light source to rotate at high speed in the middle of the load platform 1. In the process of light scanning, CCD linear array can calculate the pitch angle of the load platform 1 based on location of the recorded light spots by the CCD linear array, and provide feedback information to the leveling system. If the load platform is under a level condition, then the scanning location from each individual CCD of the CCD linear array are at the same height. If the load platform is not under a level condition, then scanning height deviation of the CCD linear array will occur along the non-leveled angle direction. If the load platform 1 is tilted upward, then the height of the corresponding light spot will shift upward. If the load platform 1 is tilted downward, then the height of the corresponding light spot will shift downward. The inclination information of the CCD linear array as well as the inclination information measured by the electronic level are feedback to the control, the control processes integration and geometric conversion for the data from the sensors within the servo cycle and sends the position shifting information of the support legs to the execution module.

In the actual control process, the control after receiving the light spot height information from the CCD linear array, requires to combine the coordinates information of the load platform measured by the indoor GPS to process calculation to obtain the inclination angle of the load platform 1 at two perpendicular direction, then the control processes parsing to obtain the required shift amount of the three support legs 2 for leveling.

The leveling method of the multi-axis supported floatation platform is realized by the measurement and control system for multi-axis supported floatation platform, comprising the following steps:

Step 1: sending current working mode, control command and error parameters through Ethernet from the host computer 12 to the control 9;

Step 2: generating a servo cycle start signal for every 200 us through the control 9, initiating translational state working mode or static state working mode; if translational state working mode is initiated, step 3 is executed; if static state working mode is initiated, step 5 is executed;

Step 3: checking if monitoring signal from the CCD linear array 7-3 is received by control 9, if yes, executing step 4; if no, executing step 6;

Step 4: obtaining an inclination angle information of the load platform 1 through calculation by the control 9 based on the monitoring signal from the CCD linear array 7-3 and the GPS signal from the indoor GPS 7-, then executing step 6';

Step 5: measuring the levelness of the load platform 1 by the electronic level 7-5 and CCD linear array 7-3 of the position measurement unit 7 and sending the levelness information to the control 9, then executing step 7;

Step 6: processing data fusion process by control 9 based on all feedback signals, obtaining an adjustment amount for support legs 2, and correcting the driving signal of the servo voice coil motor 6-1 through servo voice coil motor driver 6-2 by control 9, then executing step 8;

Step 7: processing data fusion process by control 9 based on all feedback signals, obtaining an adjustment amount for support legs 2, and correcting the driving signal of the servo voice coil motor 6-1 through servo voice coil motor driver 6-2 by control 9, then executing step 9;

Step 8: determining if the state of the load platform 1 is static, if yes, executing step 5; if no, executing step 10;

Step 9: determining if the levelness of the load platform 1 is within the preset permissible range, if yes, executing step 11; if no, executing step 5;

Step 10: determining if the levelness of the load platform 1 is within the preset permissible range, if yes, executing step 11; if no, executing step 3;

Step 11: ending the current servo cycle and returning to step 2, waiting for next servo cycle until ending.

M equals to 3, the step of processing data fusion process by control 9 based on all feedback signals and obtaining an adjustment amount for support legs 2 in step 6 and in step 7 is realized through the steps of:

Preset the composition of CCD linear array 7-3 to 6 CCDs, sequentially number the 6 CCDs, which are positioned on the circular level concrete base, along the circumferential direction as ①, ②, ③, ④, ⑤ and ⑥, utilize the center connection line of number ④ CCD and number ① CCD as the x-axis direction of space Cartesian coordinate system, the space Cartesian coordinate system is positioned on the horizontal level of the reference light X-0-Y of the linear light source 11, define the y-axis direction and z-axis direction of space Cartesian coordinate system based on right-hand rule, preset the radius of the circular level concrete base as R, the coordinates of linear array 11 at number ③ CCD as A1 (−½R, $$\frac{\sqrt{3}}{2}R,$$

H$_3$), H$_3$ is the height of light spot irradiated on the number ③ CCD by rotating light source, the coordinates of linear array 11 at number ④ CCD as B1 (−R, 0, H$_4$), H$_4$ is the height of light spot irradiated on the number ④ CCD by rotating light source, preset point K as the location of the reference spot of number ③ CCD, point J as the location of the reference spot of number ④ CCD, the coordinates of the center location of load platform 1 is C1 ($x_0$1, $y_0$1, 0), Define a perpendicular line of X-axis by point K and the point of intersection is H, the intersection of KH and C1J is point D, the DE is perpendicular to plane X-0-Y, crossing C1B1 at point E; through point E define EL1//DK, crossing A1K at point L1; ∠A1EL1 is the angle θx between plane α and the rotation along x-axis direction, plane α is the plane determined by points A1, B1 and C1, the C1F is perpendicular to DK, crossing DK at point F; the perpendicular line of DK is FG, crossing A1E at point G, connect C1G, ∠GC1F is the angle θy between plane α and the rotation along y-axis direction, define a perpendicular line of x-axis by point C1 and the point of intersection is I, from $$\frac{DE}{H_4} = \frac{C1D}{C1J} = \frac{HI}{IJ} = \frac{x_0 + \frac{1}{2}R}{x_0 + R},$$

the length of DE can be obtained by:

$$DE = \frac{x_0 + \frac{1}{2}R}{x_0 + R} \Box H_4,$$

and obtain HD=½$y_0$ from the median HD of the triangle J1C1, so $$\angle\theta_x = \angle A1EL1 = \arctan\frac{H_4 - DE}{DK} = \arctan\frac{RH_4}{(x_0 + R)(-y_0 + \sqrt{3}R)},$$

FM is perpendicular to EL1 and the point of intersection is point M, based on the coordinates relationship to obtain:
EM=DF=½$y_0$, $$EL1 = DK = \frac{\sqrt{3}}{2}R - \frac{1}{2}y_0, \quad A1L1 = H_3 - DE = H_3 - \frac{x_0 + \frac{1}{2}R}{x_0 + R}\Box H_4,$$

From $$\frac{EM}{EL1} = \frac{GM}{A1L1},$$

obtain $$GM = \frac{EM\Box A1L1}{EL1} = \frac{H_3(x_0 + R)y_0 - H_4\left(x_0 + \frac{1}{2}R\right)y_0}{(x_0 + R)(y_0 - \sqrt{3}R)},$$

Therefore, $$GF = GM + MF = $$

$$GM + DE = \frac{H_3(x_0 + R)y_0 - H_4\left(x_0 + \frac{1}{2}R\right)y_0}{(x_0 + R)(y_0 - \sqrt{3}R)} + \frac{x_0 + \frac{1}{2}R}{x_0 + R}\Box H_4,$$

based on the coordinates relationship, obtain: C1F=$x_0$ ½+R,
then, $$\angle\theta_y = \angle GC1F =$$

$$\arctan\frac{GF}{C1F} = \arctan\left(\frac{H_3 y_0}{\left(x_0 + \frac{1}{2}R\right)(y_0 - \sqrt{3}R)} - \frac{\sqrt{3}H_4 R}{(x_0 + R)(y_0 - \sqrt{3}R)}\right);$$

solving the problem based on θx and θy from calculation, construct the space Cartesian coordinate system for the floatation platform by the above method, the origin is the location of ½ of the maximum position shifting output of the servo voice coil motor 6-1, define the three connecting points A, B and C between the three support legs 2 and the bottom surface of the load platform 1. The location of point A is (0, 0, $z_1$), B is (−L, 0, $z_2$), C is ( $$-\frac{L}{2}, \frac{\sqrt{3}}{2},$$

$z_3$), where $z_1$ refers to the coordinates of point A in the space Cartesian coordinate system along the z-axis, $z_2$ refers to the coordinates of point B in the space Cartesian coordinate system along the z-axis, $z_3$ refers to the coordinates of point C in the space Cartesian coordinate system along the z-axis, based on the relationship of the three points A, B and C, obtain:

$$\theta_x = \frac{z_3 - \frac{z_1 + z_2}{2}}{\frac{\sqrt{3}}{2}L}, \quad \theta_y = \frac{z_2 - z_1}{L},$$

Assume $z_1 + z_2 + z_3 = 0$,
Solving the above equation to obtain:

$$\begin{bmatrix} z_1 \\ z_2 \\ z_3 \end{bmatrix} = \begin{bmatrix} -\frac{\sqrt{3}}{6}L & -\frac{1}{2}L \\ \frac{\sqrt{3}}{6}L & \frac{1}{2}L \\ \frac{\sqrt{3}}{3}L & 0 \end{bmatrix} \Box \begin{bmatrix} \theta_x \\ \theta_y \end{bmatrix},$$

the values of $z_1$, $z_2$, $z_3$ are the respective servo control input amount of the servo voice coil motor 6-1 of the three support legs 2 during the leveling process.

According to the present invention, the control is implemented by motion control card. The control in response to the control signal from the host computer 12, processes system initiation process such as parameters parsing for the control signal, setting the system clock, interrupt initiation, process initiation of GPIO port, process initiation of variables and control parameters setting.

In the execution process of the leveling process, the proximity sensors 8-1 are always used to measure the motion of the servo voice coil motor to determine if the stroke threshold is exceeded, if yes, the servo voice coil motor driver 6-2 is controlled to stop through the control 9; meanwhile, through the temperature sensor 8-2, the internal temperature of the servo voice coil motor is monitored to determine if the threshold temperature is exceeded, if yes, the servo voice coil motor driver 6-2 is controlled to stop through the control 9, thus providing protection to the servo voice coil motor driver 6-2.

What is claimed is:

1. A measurement and control system for a multi-axis supported floatation platform, characterized in that, the system processes measurement and control of the multi-axis supported floatation platform, the multi-axis floatation platform comprises a load platform (1), M number of support legs (2), M number of floatation cylinders (3) and M number of gas bearings (4), where M is 3, 4, 5, 6, 7 or 8, the load platform (1) is a circular platform, the load platform (1) is supported by the M number of support legs (2), M number of connecting points are defined at the position where the M number of support legs (2) and a bottom surface of the load platform 1 are connected and form a regular M-polygon, each of the support leg (2) has one end connected to one floatation cylinder (3), each of the floatation cylinder (3) has a bottom end connected to one gas bearing (4) through floatation ball bearing, the measurement and control system comprises a load feedback unit (5), an execution unit (6), a position measurement unit (7), a safety unit (8), a control (9), a rotary motor (10) and a linear light source (11), the load feedback unit (5) comprises M number of pressure sensors (5-1) and four differential sensors (5-2); the execution unit (6) comprises M number of servo voice coil motors (6-1) and M number of servo voice coil motor drivers (6-2); the position measurement unit (7) comprises a plane grating (7-1), M number of linear gratings (7-2), a CCD linear array (7-3), an inclination sensor (7-4), M number of electronic levels (7-5) and an indoor GPS (7-6); the safety unit (8) comprises 2M number of proximity sensors (8-1) and M number of temperature sensors (8-2); the CCD linear array is formed by not less than six CCDs, the multi-axis floatation platform is arranged to position on a circular concrete base, all the CCDs of the CCD linear array (7-3) are positioned uniformly along the circumferential direction of the circular concrete base, the load platform (1) comprises a rotary motor (10), the rotary motor (10) has a top surface at which the linear light source (11) is positioned, each of the support leg (2) has an inner portion in which one pressure sensor (5-1), one servo voice coil motor (6-1) and one linear grating (7-2) are arranged, the pressure sensor (5-1) is arranged for measuring the torque of the corresponding support leg (2), the servo voice coil motor (6-1) is arranged for driving extension and retraction movement of the corresponding support leg (2), each of the servo voice coil motor (6-1) is driven by one servo voice coil motor driver (6-2), the linear grating (7-2) is arranged for collecting displacement amount information produced from driving the support leg (2) by the servo voice coil motor (6-1), the four differential sensors (5-2) are uniformly distributed along the circumferential direction of the load platform (1) on the outer edge of a top surface of the load platform (1), the differential sensors (5-2) are arranged for measuring the relative position between the load platform (1) and a load on the load platform (1), the plane grating (7-1) is installed on the top surface of the load platform (1), the plane grating (7-1) is arranged for measuring the relative displacement amount of the load on the load platform occurred at two relative perpendicular directions with respect to the load platform (1), the inclination sensor (7-4) and the M number of electronic levels (7-5) are mounted onto the top surface of the load platform (1), the inclination sensor (7-4) is arranged for measuring a vibration angle of the load platform (1) at an x-direction and an y-direction under a spatial coordination system in a process of movement, the M number of electronic levels (7-5) are corresponding to the positions of the M number of connecting points between the bottom surface of the load platform (1) and the M number of support legs (2), the electronic levels (7-5) are arranged for measuring the static state of the load platform (1), the indoor GPS (7-6) is mounted on an upper position relative to the circular concrete base and is arranged for measuring position coordinates of the load platform (1) on the circular concrete base, each of the support leg (2) has an upper displacement limit and a lower displacement limit of its inner portion and one proximity sensor (8-1) is provided at each of the position of the upper and the lower displacement limit respectively, the proximity sensor (8-1) is arranged for providing real-time position limit alert, each of the servo voice coil motor (6-1) comprises one temperature sensor (8-2) installed at its inner portion, the temperature sensor (8-2) is arranged for providing a real-time temperature alert, the pressure sensor (5-1) has a pressure signal output terminal connected to a pressure signal input terminal of the control (9), the differential sensor (5-2) has a position signal output terminal connected to a position signal input terminal of the control (9), the control 9 has an actuating control signal output terminal connected to an actuating control signal input terminal of the servo voice coil motor driver (6-2), the servo voice coil motor driver (6-2) has an actuating signal output terminal connected to the actuating signal input terminal of the servo voice coil motor (6-1), the servo voice coil motor (6-1) has an actuating signal output terminal connected to the actuating signal input terminal of the support leg (2), the plane grating (7-1) has a relative position displacement signal output terminal connected to a relative position displacement signal input terminal of the control (9), the linear grating (7-2) has a support leg position displacement signal output terminal connected to a support leg position displacement signal input terminal of the control (9), the CCD liner array (7-3) has a monitor signal output terminal connected to the monitor signal input terminal of the control (9), the inclination sensor (7-4) has an inclination signal output terminal connected to an inclination signal input terminal of the control (9), the electronic level (7-5) has a level signal output terminal connected to a level signal input terminal of the control (9), the indoor GPS (7-6) has a GPS signal output terminal connected to a GPS signal input terminal of the control (9), the temperature sensor (8-2) has a temperature signal output terminal connected to a temperature signal input terminal of the control (9), the proximity sensor (8-1) has a position limit signal output terminal connected to a position limit signal input terminal of the control (9).

2. The measurement and control system for a multi-axis supported floatation platform according to claim 1, characterized in that, the system further comprises a host computer (12) and a status display board (13), the host computer has a signal transmission terminal connected to a signal transmission terminal of the control (9), the host computer has a display signal output terminal connected to a display signal input terminal of the status display board.

3. The measurement and control system for a multi-axis supported floatation platform according to claim 2, characterized in that, the M number of support legs (2) refers to three support legs, a radius of the load platform is 2 m, the three support legs connected to the bottom surface of the load platform through three connecting points to form an equilateral triangle, the distance between a vertex of the equilateral triangle and a center of the load platform (1) is 1.4 m.

* * * * *